May 27, 1924.
J. A. ANGLADA
1,495,238
REDUCTION GEARING FOR MOTOR VEHICLES
Filed March 16, 1922   3 Sheets-Sheet 3
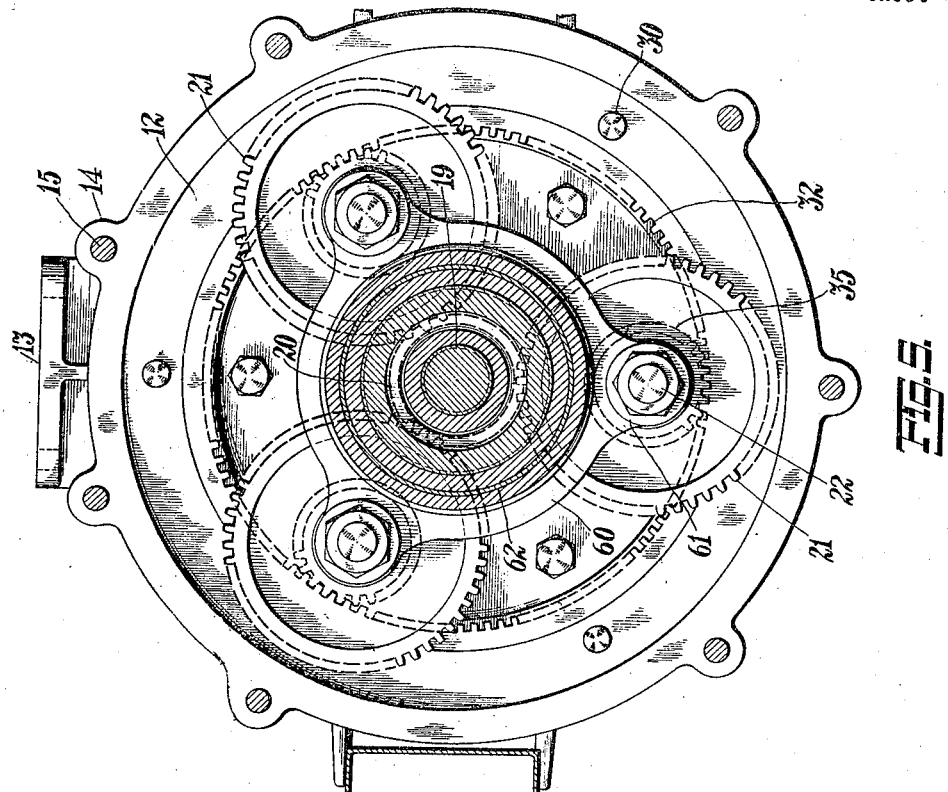
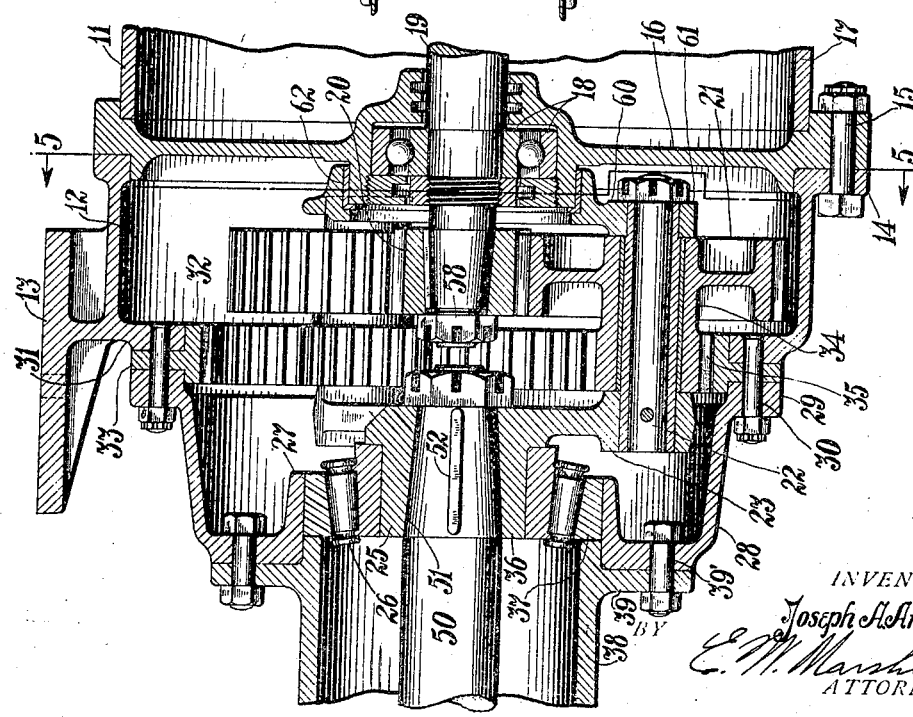
INVENTOR
Joseph A. Anglada
BY
E. W. Marshall
ATTORNEY Patented May 27, 1924.

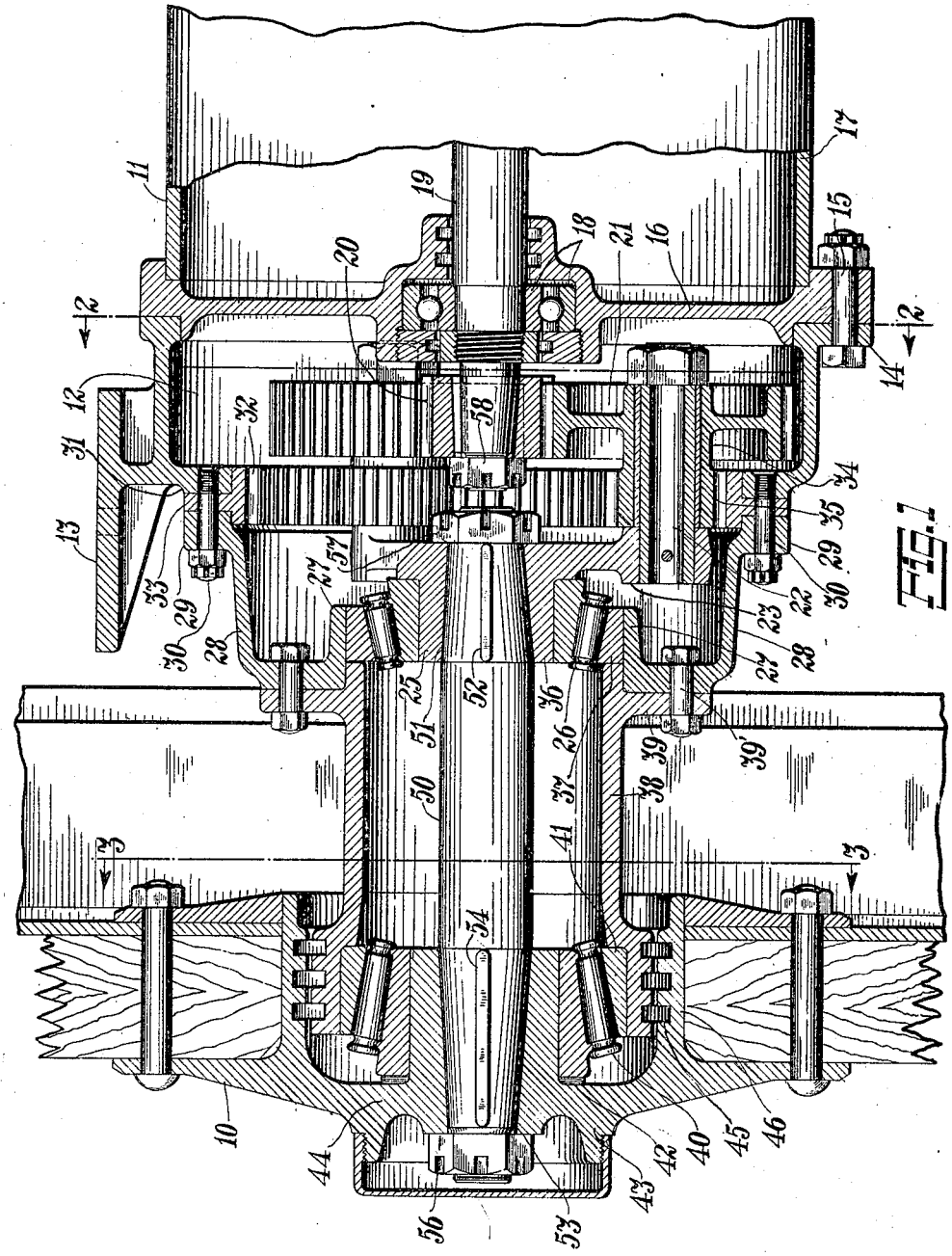

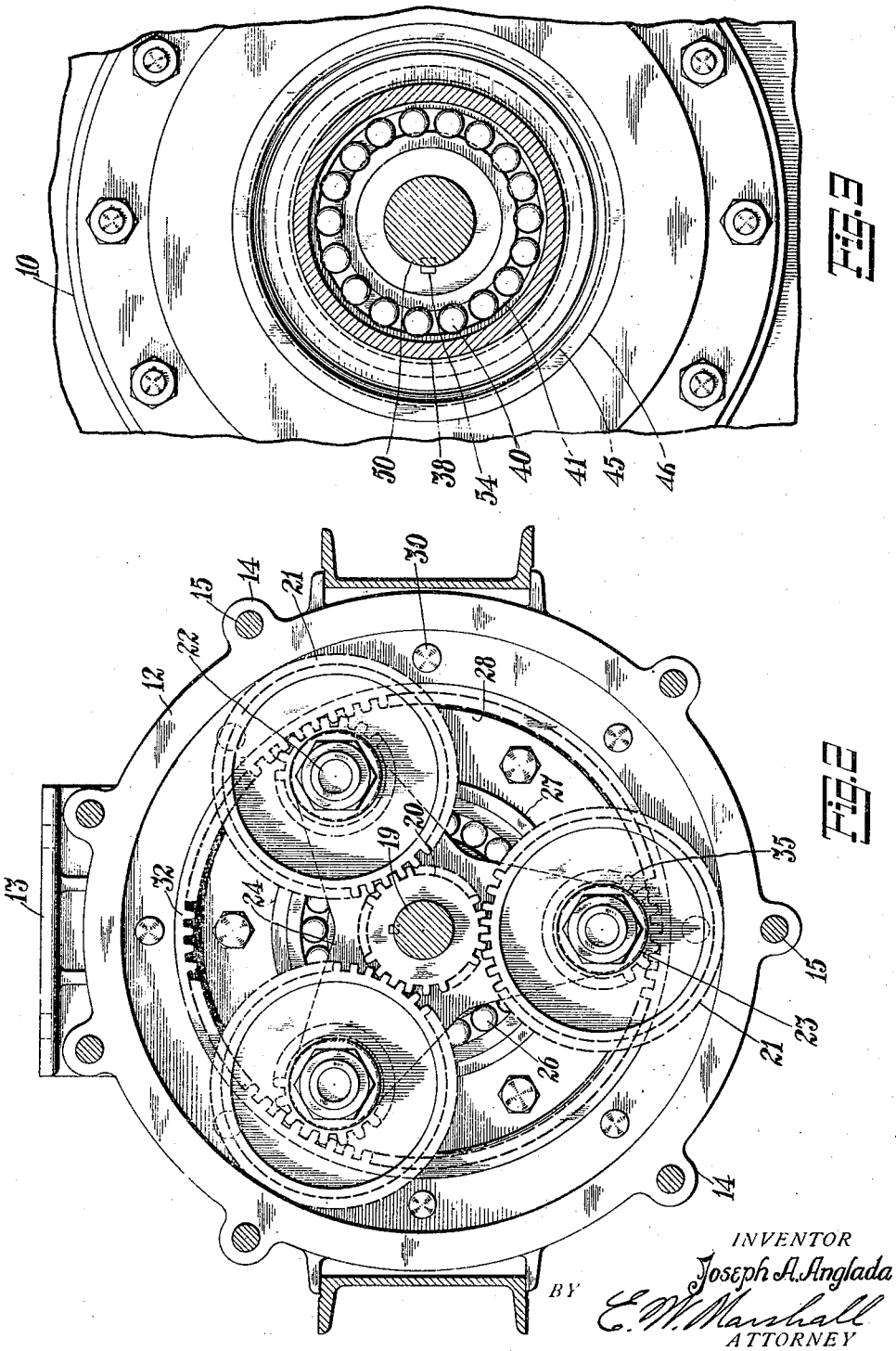

1,495,238

UNITED STATES PATENT OFFICE.

JOSEPH A. ANGLADA, OF JENKINTOWN, PENNSYLVANIA.

REDUCTION GEARING FOR MOTOR VEHICLES.

Application filed March 16, 1922. Serial No. 544,348.

*To all whom it may concern:*

Be it known that I, JOSEPH A. ANGLADA, a citizen of the United States, and a resident of Jenkintown, county of Montgomery, and State of Pennsylvania, have invented certain new and useful Improvements in Reduction Gearing for Motor Vehicles, of which the following is a specification.

This invention relates to motor vehicles and more particularly to reduction gearing between the motor and the vehicle drive wheels and to the mounting of these parts.

The invention, moreover, has been particularly worked out in that type of vehicle in which each vehicle drive wheel is operated by a separate electric motor and the invention will therefore be described particularly with respect to this embodiment thereof.

The invention has for its object to provide reduction gearing and in the particular embodiment of the invention shown to provide double reduction gearing between the motor and the vehicle drive wheel so mounted and so constructed and arranged that the driving and driven parts will be maintained in correct alinement.

Another object of the invention is to so mount the power transmission gearing for driving a motor vehicle that the cooperating parts of the gearing will be always maintained in proper and uniform meshing relation thereby securing a quietly operating mechanism.

Another object of the invention is to so mount the drive gearing, gear casing and drive wheels of a motor vehicle that the wheels, gearing and casing can be removed as a unit from the motor and housing thereby giving ready access to the gearing and bearings.

Further objects of the invention will be apparent from the following specification taken in connection with the drawings which form a part of this application and in which—

Fig. 1 is a sectional elevation of a motor, drive wheels and connecting gearing and the casing enclosing these parts.

Fig. 2 is a transverse sectional elevation taken substantially on line 2—2 of Fig. 1.

Fig. 3 is a transverse sectional elevation partly broken away and taken on line 3—3 of Fig. 1.

Fig. 4 is a sectional elevation, broken away, of another form of planetary spider support and the gearing connection between the motor and wheel; and Fig. 5 is a transverse sectional elevation taken substantially on line 5—5 of Fig. 4.

Referring to the drawings, and particularly to Figs. 1–3, the drive wheel 10 and motor 11 are carried by a gear housing 12 and are connected through this housing to the motor vehicle. For the purpose of connecting the housing 12 to the vehicle, a flange 13 is formed on the housing and is connected, in any suitable manner, preferably to the vehicle springs.

The housing is connected to the motor 11 by means of a laterally extending flange 14 which is secured by bolts 15 to the outer periphery of a head 16 mounted on the motor casing 17.

The head 16 has formed centrally therein a bearing in which is mounted a roller bearing 18 for the motor shaft 19.

A pinion 20 is secured to the end of the shaft 19 and meshes with planet gears 21 mounted on stub shafts 22 carried by arms 23 of a spider 24. The hub 25 of the spider is mounted in roller bearings 26 which in turn are carried by bearing sleeve 27 formed on a casing 28 having a flange 29 secured by bolts 30 to an inwardly extending flange 31 formed on the housing 12. An annular or ring gear 32 is secured to the housing 12 and casing 28 by means of an outwardly extending flange 33 which is positioned between the flange 31 on the housing 12 and the flange 29 on the casing 28.

The planet gears 21 have formed on or secured to their hubs 34 gears 35 which mesh with the ring gear 32.

The roller bearings 26 are positioned between the inner ends of the arms 23 as shown at 36 and one end 37 of a longitudinally extending sleeve 38 and the sleeve 38 has a laterally extending sleeve 39 secured by bolts 39′ to the casing 28. At the other end of the sleeve 38 are mounted roller bearings 40 which are positioned between a shoulder 41 formed on the sleeve and shims 42 carried by the wheel hub 43 and positioned between the outer or closed end 44 of the hub and the outer end of the roller bearing cage. Suitable registering grooves 45 are provided in the outer surface of the outer end of the sleeve 38 and the inner surface of a flange 46 formed on the wheel hub and these recesses receive and confine the excess of oil from the bearings and other parts.

The drive from the spider hub 25 to the wheel hub 44 is obtained through a shaft 50 having a conical end 51 keyed as shown at 52 to the spider hub 55 and having its outer conical end 53 keyed as shown at 54 to the wheel hub 44.

The roller bearings 40 and 26 are properly adjusted by means of suitably manipulating the nuts 56 and 57 respectively secured to the outer and the inner ends of the shaft 50 and by removing or adding shims 42. A nut 58 is secured to the outer end of the motor or armature shaft 19 and retains the pinion 20 in position thereon.

If, for any reason, access to the gearing and bearings should be desired this may be had by removing the nuts from the bolts 30 and withdrawing the wheel and its bearings and the gearing and spider from the housing 12. The motor 11 can be removed from the housing 12 by loosening the nuts on the bolts 15.

The gearing shown in Figs. 4 and 5 is substantially the same as that shown in Figs. 1-3 but additional supporting means for the planetary spider and spider arms 23 has been provided. This means comprises an annular member or ring 60 having lugs 61 formed thereon with openings therein receiving the ends of the shafts 22. This ring is journaled, as shown at 62 on the outer surface of a hub formed around the central opening in the plate 16.

From the above description it will be evident that a construction has been provided in which the shafts 19 and 50 will be always maintained in proper alinement and further that the gearing will be securely retained in proper meshing relation thereby insuring quiet operation. Furthermore, by enclosing all of the parts within a casing, dust and dirt are effectively prevented from gaining access to the bearings and gears.

Although one specific embodiment of the invention has been particularly shown and described, it will be evident to those skilled in the art that changes in the construction and in the arrangement of the various cooperating parts may be made without departing from the spirit or scope of the invention as expressed in the following claims.

What I claim is:

1. In combination, a housing, a motor secured thereto and having a shaft extending into said housing, a pair of bearings carried by said housing, planetary gearing including a spider journaled in one of said bearings, gearing connecting said planetary gearing to the motor shaft, a wheel having a hub journaled in the other of said bearings and a shaft secured to said spider and to the wheel hub.

2. In combination, a housing, a motor secured thereto and having a shaft extending into the housing, a casing detachably secured to the housing, a pair of bearings carried by said casing, a planetary gear spider having a hub journaled in one of said bearings, a wheel hub journaled in another of said bearings, a shaft keyed to said hubs and reduction gearing in said housing connecting the planet gear spider to said motor shaft.

3. In combination, a housing, a motor secured thereto and having a shaft extending into the housing, a casing detachably secured to the housing, a pair of bearings carried by said casing, a planetary gear spider having a hub journaled in one of said bearings, a wheel hub journaled in another of said bearings, a shaft keyed to said hubs, gearing in said housing connecting the planet gear spider to said motor shaft, and means for adjusting said hubs and bearings.

In witness whereof, I have hereunto set my hand this 26th day of January, 1922.

JOSEPH A. ANGLADA.